(12) United States Patent
Höfermann

(10) Patent No.: US 11,097,351 B2
(45) Date of Patent: Aug. 24, 2021

(54) CUTTING TOOL AND CUTTING INSERT WITH FLUID FLOW STRUCTURES

(75) Inventor: Volker Höfermann, Langenfeld (DE)

(73) Assignee: Seco Tools AB, Fagersta (SE)

( * ) Notice: Subject to any disclaimer, the term of this patent is extended or adjusted under 35 U.S.C. 154(b) by 2070 days.

(21) Appl. No.: 13/615,921

(22) Filed: Sep. 14, 2012

(65) Prior Publication Data

US 2013/0017024 A1 Jan. 17, 2013

Related U.S. Application Data

(63) Continuation of application No. 13/143,349, filed as application No. PCT/SE2010/050194 on Feb. 19, 2010, now Pat. No. 9,302,326.

(30) Foreign Application Priority Data

Feb. 20, 2009 (SE) .................................. 0950092-7

(51) Int. Cl.
  *B23B 27/10* (2006.01)
  *B23B 27/16* (2006.01)

(52) U.S. Cl.
  CPC .......... *B23B 27/10* (2013.01); *B23B 27/1614* (2013.01); *B23B 2200/086* (2013.01); *B23B 2260/03* (2013.01); *Y10T 407/14* (2015.01); *Y10T 407/2282* (2015.01); *Y10T 407/23* (2015.01); *Y10T 407/235* (2015.01); *Y10T 407/24* (2015.01); *Y10T 407/245* (2015.01); *Y10T 407/28* (2015.01)

(58) Field of Classification Search
  USPC ........ 407/113, 114, 115, 107, 109, 111, 102, 407/103, 104, 11
  See application file for complete search history.

(56) References Cited

U.S. PATENT DOCUMENTS

| 3,701,187 A | 10/1972 | Erkftitz |
| 6,447,218 B1 | 9/2002 | Lagerberg |
| 2004/0240949 A1 | 12/2004 | Pachao-Morbitzer et al. |
| 2008/0175567 A1 | 7/2008 | Prichard et al. |

(Continued)

FOREIGN PATENT DOCUMENTS

| DE | 3326667 A1 | 3/1984 |
| DE | 4209084 | 9/1993 |

(Continued)

OTHER PUBLICATIONS

English Translation of Application document JP 2004-237323 (equivalent to Publication document No. JP 2006-55916).*

(Continued)

*Primary Examiner* — Nicole N Ramos
(74) *Attorney, Agent, or Firm* — WRB-IP LLP

(57) ABSTRACT

A cutting tool includes a cutting insert comprising a top surface, a bottom surface, a clamping surface for abutting a clamp, a cutting edge, a hole extending through the insert from the bottom surface to the clamping surface, and a channel extending from the clamping surface to proximate the cutting edge, and a tool holder comprising a tool holder body having a pocket for receiving the insert, a clamp for contacting the clamping surface and clamping the insert in the pocket, and a tool holder passage in the body in flow communication with the hole in the insert. A cutting insert is also provided.

5 Claims, 4 Drawing Sheets

(56) References Cited

U.S. PATENT DOCUMENTS

2008/0175676 A1    7/2008  Prichard et al.
2008/0175678 A1*   7/2008  Prichard et al. ................ 407/11
2008/0193231 A1*   8/2008  Jonsson et al. ................ 407/11

FOREIGN PATENT DOCUMENTS

EP         599393 A1 *  6/1994
JP         200605916 A    3/2006
JP        2006055916 A *  3/2006

OTHER PUBLICATIONS

Translation of Russian Official Action (dated Dec. 2, 2013) from corresponding Russian Application 2011138411.
Chinese Official Action (dated Nov. 2, 2014) for corresponding Chinese Application 201080008704.3.

* cited by examiner

CUTTING TOOL AND CUTTING INSERT WITH FLUID FLOW STRUCTURES

The present application is a continuation of U.S. application Ser. No. 13/143,349, filed Jul. 6, 2011, which is a U.S. national stage application of International Application PCT/SE2010/050194, filed Feb. 19, 2010, which claims priority to Swedish Application SE 0950092-7, file Feb. 20, 2009, all of which are incorporated by reference.

BACKGROUND AND SUMMARY

The present invention relates generally to cutting tools and cutting inserts and, more particularly, to such cutting tools and inserts having fluid flow channels.

Conventional techniques for providing lubricating and/or cooling fluid to cutting edges of cutting inserts typically involve introducing the fluid via openings in a toolholder for the cutting insert, or via spray nozzles directed at the cutting edges. Some cutting inserts include channels formed in the inserts that are in flow communication with and facilitate introduction of fluid from channels provided in the toolholder body. The provision of these fluid flow channels in the cutting inserts tends to substantially complicate manufacture of the inserts, and the channels can weaken the insert. It is desirable to provide a cutting tool and cutting insert that facilitate introduction of fluid to the cutting edges of the insert that minimizes manufacturing complexity. It is also desirable to provide a cutting tool and cutting insert that facilitate introduction of fluid to the cutting edge without substantially interfering with the strength of the insert.

According to an aspect of the present invention, a cutting insert comprises a top surface, a bottom surface, a clamping surface for abutting a clamp, a cutting edge, a hole extending through the insert from the bottom surface to the clamping surface, and a channel extending from the clamping surface to point proximate and inward of the cutting edge.

According to an aspect of the present invention, a cutting tool comprises a cutting insert comprising a top surface, a bottom surface, a clamping surface, a cutting edge, a hole extending through the insert from the bottom surface to the clamping surface, and a channel extending from the clamping surface to proximate the cutting edge, and a toolholder comprising a toolholder body having a pocket for receiving the insert, a clamp for contacting the clamping surface and clamping the insert in the pocket, and a toolholder passage in the body in flow communication with the hole in the insert.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1A:
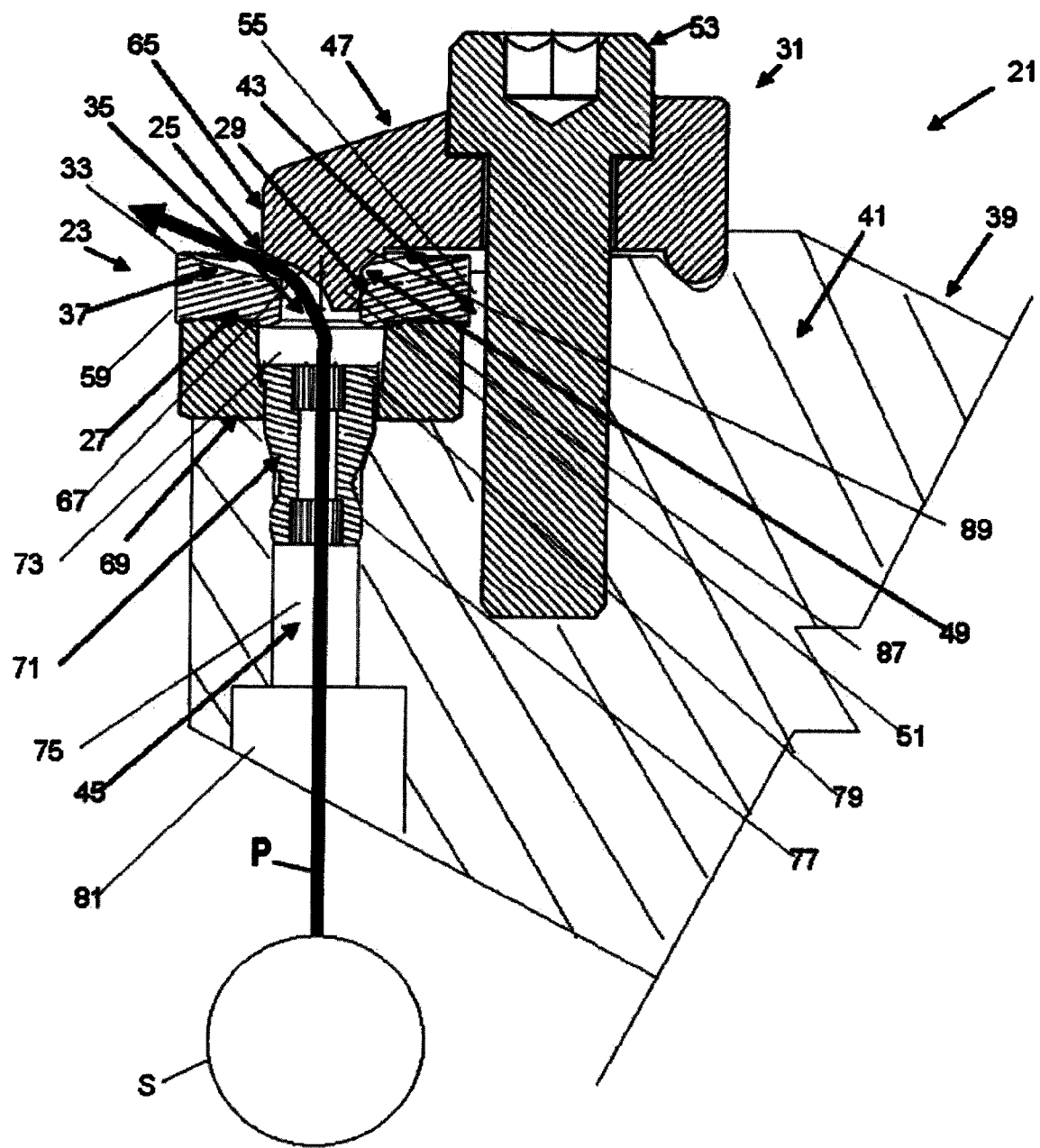
FIG. 1A is a side, cross-sectional view of a portion of a cutting tool according to an aspect of the present invention.

An illustrative cutting tool 21 according to an aspect of the present invention is shown in FIG. 1A. The cutting tool 21 comprises a cutting insert 23 comprising a top surface 25 and a bottom surface 27. The insert 23 also comprises a clamping surface 29 for abutting a clamp 31 and a cutting edge 33. A hole 35 extends through the insert 23 from the bottom surface 27 to the clamping surface 29. A channel 37 extends from the clamping surface 29 to point proximate and inward of the cutting edge 33.

The cutting tool 21 also comprises a toolholder 39 comprising a toolholder body 41 having a pocket 43 for receiving the insert 23. The toolholder 39 also comprises the clamp 31 for contacting the clamping surface 29 and clamping the insert in the pocket 43. The toolholder 39 also comprises a toolholder passage 45 in the body 41 in flow communication with the hole 35 in the insert 23. By providing the cutting tool 21 and cutting insert 23 with a fluid flow passage P extending from the toolholder passage 45 through a hole 35 extending through the insert from the bottom surface 27 to the clamping surface 29, and a channel 37 extending from the clamping surface to proximate the cutting edge 33, introduction of fluid to the cutting edges of the insert can be achieved in a manner that minimizes manufacturing complexity and that does not substantially interfere with the strength of the insert, as many insert types are already manufactured with holes for clamping members extending through them.

Figure 1C:
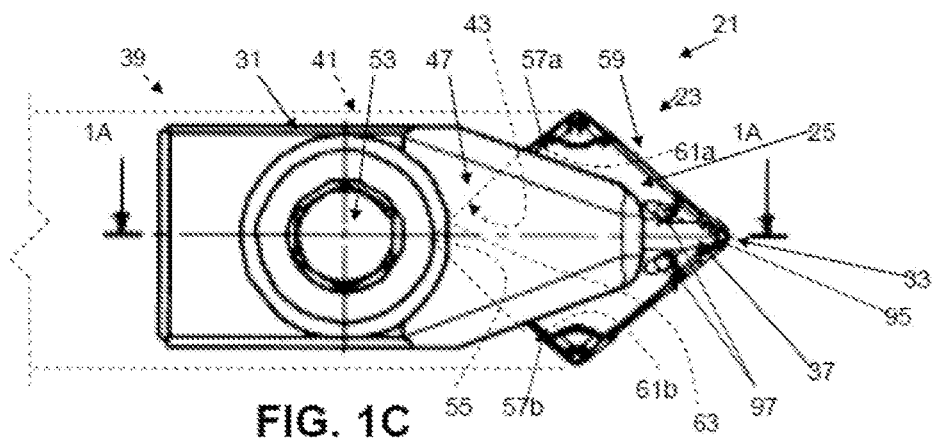
FIG. 1B is a side view and FIG. 1C is a top view of components of a cutting tool according to an aspect of the present invention.
Figure 1B:
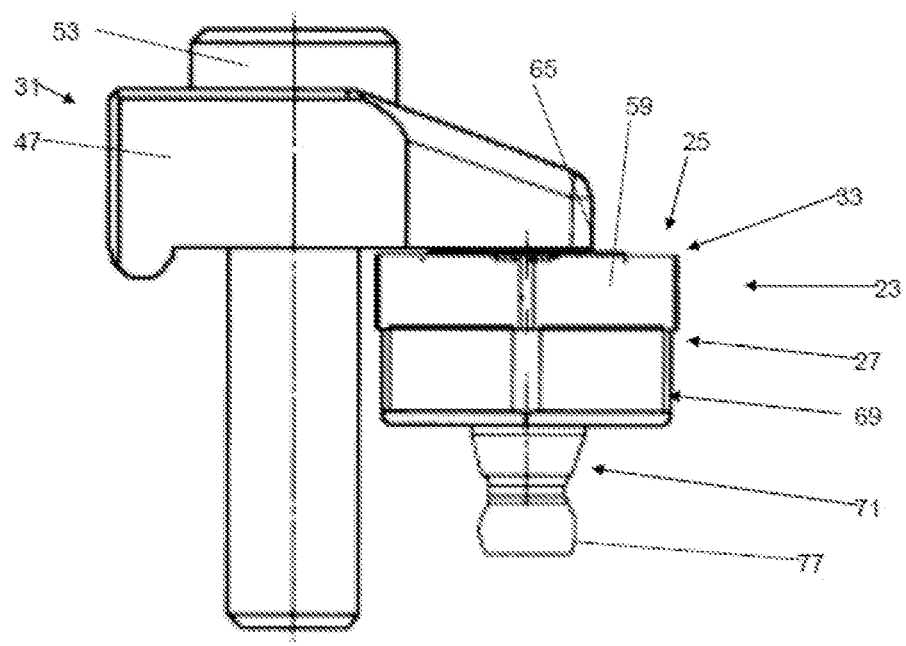

In the cutting tool 21 and components of the cutting tool illustrated in FIG. 1A-1C, the clamp 31 can comprise a clamping arm 47 having an arm clamping surface 49 for contacting the clamping surface 29. Where, as in the insert 23 shown in FIG. 1A, the clamping surface 29 is in the form of a truncated cone, the rear end 51 of the arm clamping surface 49 will ordinarily be rounded, such as partially spherical or in the form of a cone or a truncated cone, so that there will be substantially line contact between the clamping surface 29 and the arm clamping surface 49.

As with conventional arm clamping-type clamps, when a bolt 53 securing the clamping arm 47 to the body 41 of the toolholder 39 is tightened, the arm will tend to pivot and the arm clamping surface 49 will tend to urge the insert 23 toward the bolt 53 and into a corner 55 of the pocket 43. As seen in FIG. 1C, ordinarily, at least two side insert supporting points or areas 57a and 57b on the edge surface 59 of the insert 23 will contact corresponding abutment points or areas 61a and 61b (shown in phantom) on side surfaces 63 of the pocket. A forward portion 65 of the clamping arm 47 can include a recess 67 so that, when the rear end 51 of the arm clamping surface 49 contacts the clamping surface 29 of the insert 23, the clamping arm will not prevent flow communication between the hole 35 and the channel 37.

Instead of a clamp having a clamping arm, the clamp can take other suitable forms such as a bolt having a clamping surface that extends through a hole in the insert and mates with a threaded opening in the toolholder. The bolt can have a passage for permitting fluid flow through the hole to the channel. A deflecting surface for deflecting fluid into the channel can be provided on the bolt, e.g., at the top of a passage in the bolt below a head of the bolt, or can be provided separately, such as on the toolholder or a separate member that may be secured, e.g., by the bolt.

As seen in FIGS. 1A and 1B, the toolholder 39 can comprise a shim 69 disposed in the pocket 43. As seen in FIG. 1A, the toolholder passage 45 extends at least in part through the shim 69. A fitting 71 can extend through a hole 73 in the shim 69 and into an opening 75 in the toolholder body 41. The fitting 71 can be a bolt, and the opening 75 can be a threaded opening for mating with the bolt, however, FIG. 1A shows a fitting that merely extends through the hole 73 in the shim into an opening and includes an open end 77 that is in flow communication with a source S of fluid, such as by connecting the end to a fitting on a hose connected to a reservoir of cooling and/or lubricating fluid (e.g., liquid, air, etc.) or by connecting a fitting on a hose to an opening 81 on the body of the toolholder that forms part of the toolholder passage 45. The toolholder passage 45 can extend at least in part through the hole 73 in the shim 69 and can extend at least in part through the fitting 71. The fitting 71 can include an enlarged end 79 that is prevented from passing entirely through the hole 73 in the shim 69.

Figure 2B:
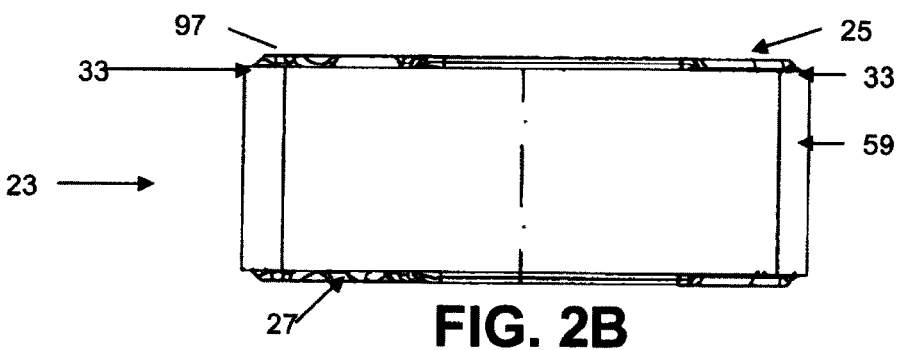
FIG. 2B is a side view.
Figure 2A:
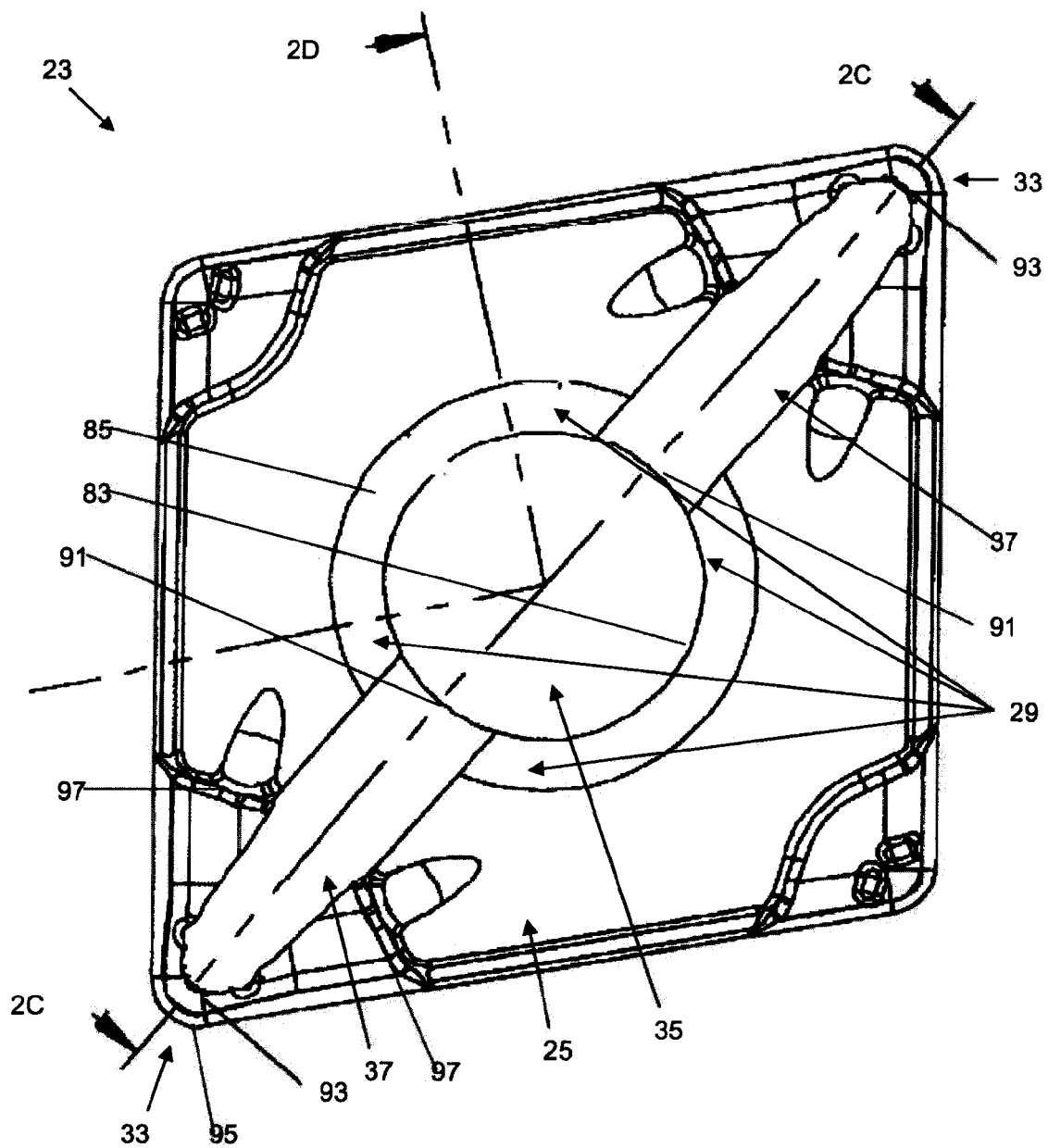
FIG. 2A is a top view.
Figure 2C:
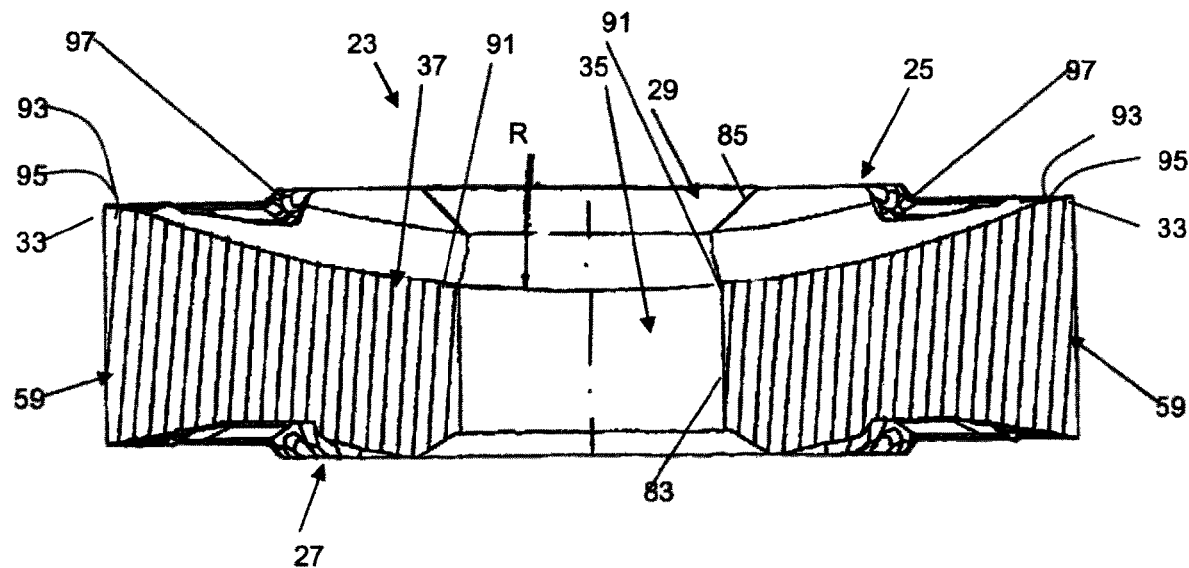
FIG. 2C is a side, cross-sectional view.
Figure 2D:
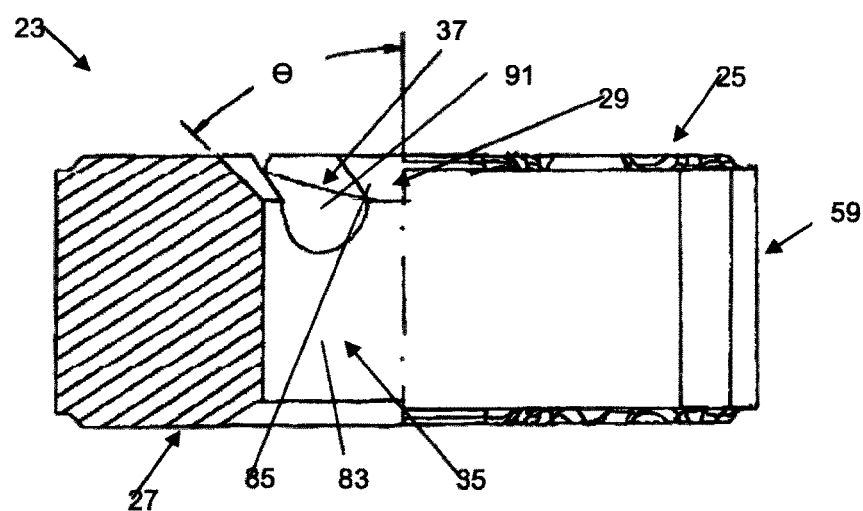
FIG. 2D is a side, partially cross-sectional view of an insert according to an aspect of the present invention.

As seen in FIGS. 2A and 2C, the hole 35 in the insert 23 comprises a first portion 83 having a substantially constant diameter along its length and a second portion 85 that has a diameter that changes over at least part of its length. Ordinarily, the second portion 85 of the hole 35 is a frustoconical portion defining an angle • (FIG. 2D showing an angle of 45°) with an axis of the hole 35 or a substantially frustoconical portion. The second portion 85 can comprise at least part of the clamping surface 29 and ordinarily the clamping surface comprises a substantially smooth surface interrupted by the channel 37. By "smooth" is here meant a surface like a directly pressed surface that does not exhibit a high surface roughness or irregularities. The first portion 83 of the hole 35 can form at least part of the clamping surface 29, as well. As seen in FIG. 1A, the rear end 51 of the arm clamping surface 49 includes a first portion 87 that is intended to abut the first portion 83 of the hole 35 of the insert, and a frustoconical portion 89 that is intended to abut the second portion 85 of the hole. By providing the recess 67 at the forward portion 65 of the arm clamping surface 49, positioning of the recess so that it does not block the channel 37 can be ensured.

As seen in FIG. 2C, the channel 37 can be radiused with radius R and a depth of the channel is ordinarily greater at a first end 91 of the channel at the clamping surface 29 than at a second end 93 proximate and inward of the cutting edge 33. The depth of the channel 37 at the first end 91 of the channel can be greater than a depth of the second portion 85 of the hole 35. In the insert 23 shown in FIG. 1, the depth of the channel 37 decreases toward the cutting edge so that the second end 93 of the channel merges into the top surface 25 before the cutting edge 33. The top surface 25 comprises a strengthening geometry or land surface 95 between the cutting edge 33 and the second end 93 of the channel 37. Chipbreakers 97 can be provided on opposite sides of the channel 37.

In an insert 23 comprising at least two cutting edges 33 as seen in, e.g., FIGS. 2A-2C, at least two channels 37 (seen in FIGS. 2A and 2C) can be provided, and at least one channel of the at least two channels can extend from the clamping surface 29 to proximate and inward of a respective one of the cutting edges 33. Some or all of the channels 37 can be disposed under the arm clamping surface 49, as seen in FIG. 1A. Additional channels can be provided proximate each cutting edge if desired. In an insert comprising only a single cutting edge, for example, at least one channel extends from a clamping surface to proximate the cutting edge, and additional channels can be provided if desired.

FIGS. 1A-2D show a single sided cutting insert, however, it will be appreciated that the insert can be a double sided insert. FIGS. 1A and 1C show a cutting tool and insert that is used in a turning operation, however, it will be appreciated that the cutting tool and insert can be used in any cutting operation.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The disclosures in Swedish patent application No. 0950092-7, from which this application claims priority, are incorporated herein by reference.

What is claimed is:

1. A cutting tool comprising:
   a tool holder including a coolant bore;
   a cutting insert including a cutting edge and a fastening bore, wherein the fastening bore comprises a first mating surface; and
   a fastener adapted to secure the cutting insert to the tool holder, the fastener comprising a head portion;
   wherein when the cutting insert is secured to the tool holder by securing the fastener through the fastening bore, the fastening bore and the fastener define a cavity fluidly communicating with the coolant bore and adapted to direct a coolant through the cutting insert and toward the head portion;
   wherein the head portion comprises;
   a tapered second mating surface structured to securely abut a portion of the first mating surface of the fastening bore when the fastener is secured through the fastening bore; and
   a recess extending radially inward from the tapered second mating surface, wherein the recess is adapted to direct a coolant fluid to the cutting edge of the cutting insert.

2. The cutting tool of claim 1, where the head portion further comprises a lip portion adapted to direct coolant from the cavity toward the cutting edge when the cutting insert is secured to the tool holder by securing the fastener through the fastening bore.

3. The cutting tool of claim 1, wherein the cutting tool is one of a milling tool, a boring tool, a turning tool, a drilling tool, and a general machining tool.

4. The cutting tool of claim 1, wherein the fastening bore of the cutting insert comprises a recess, and the fastening bore and the fastener define a cavity fluidly communicating with the coolant bore and adapted to direct a coolant through the cutting insert and toward the head portion when the cutting insert is secured to the tool holder by the fastener.

5. The cutting tool of claim 1, wherein the head portion includes the recess and a lip portion adapted to work together to direct a coolant fluid toward a cutting edge of the cutting insert secured to the tool holder by the fastener.

* * * * *